United States Patent
Albers et al.

(10) Patent No.: US 9,409,354 B2
(45) Date of Patent: Aug. 9, 2016

(54) LAMINATED FIBER METAL COMPOSITE

(71) Applicant: The Boeing Company, Chicago, IL (US)

(72) Inventors: Robert G. Albers, Bellevue, WA (US); Jack A. Woods, Kent, WA (US)

(73) Assignee: The Boeing Company, Chicago, IL (US)

( * ) Notice: Subject to any disclaimer, the term of this patent is extended or adjusted under 35 U.S.C. 154(b) by 217 days.

(21) Appl. No.: 14/164,783

(22) Filed: Jan. 27, 2014

(65) Prior Publication Data

US 2014/0141215 A1    May 22, 2014

Related U.S. Application Data

(62) Division of application No. 11/328,012, filed on Jan. 9, 2006, now Pat. No. 8,636,936, which is a division of application No. 10/649,280, filed on Aug. 27, 2003, now abandoned.

(51) Int. Cl.

| | |
|---|---|
| *B29C 70/48* | (2006.01) |
| *B29C 70/54* | (2006.01) |
| *B29C 70/88* | (2006.01) |
| *B32B 3/26* | (2006.01) |
| *B32B 15/14* | (2006.01) |
| *B32B 38/08* | (2006.01) |
| *B32B 38/04* | (2006.01) |

(52) U.S. Cl.
CPC ............... *B29C 70/48* (2013.01); *B29C 70/545* (2013.01); *B29C 70/885* (2013.01); *B32B 3/266* (2013.01); *B32B 15/14* (2013.01); *B32B 38/08* (2013.01); *B32B 2038/047* (2013.01); *Y10T 156/1052* (2015.01); *Y10T 156/1056* (2015.01); *Y10T 156/1062* (2015.01); *Y10T 156/1075* (2015.01); *Y10T 428/24331* (2015.01); *Y10T 428/24917* (2015.01)

(58) Field of Classification Search
CPC .............................. B29C 70/48; B29C 70/885
See application file for complete search history.

(56) References Cited

U.S. PATENT DOCUMENTS

| | | | | | |
|---|---|---|---|---|---|
| 2,372,929 | A | * | 4/1945 | Blessing | B27D 1/04 156/273.9 |
| 2,913,036 | A | * | 11/1959 | Smith | B29C 70/443 249/DIG. 1 |
| 2,982,494 | A | * | 5/1961 | Amason | B64D 45/02 174/2 |
| 2,992,317 | A | * | 7/1961 | Hoffman | B64D 15/12 219/202 |
| 3,906,308 | A | * | 9/1975 | Amason | B64D 45/02 244/1 A |
| 3,989,984 | A | * | 11/1976 | Amason | B29C 70/885 244/1 A |
| 4,158,078 | A | * | 6/1979 | Egger | B32B 17/04 219/528 |
| 4,255,478 | A | * | 3/1981 | Crane | B29C 70/083 416/230 |
| 4,429,216 | A | * | 1/1984 | Brigham | H05B 3/145 219/528 |
| 4,554,204 | A | * | 11/1985 | Ono | B29C 70/08 264/1.9 |
| 4,583,702 | A | * | 4/1986 | Baldwin | H01Q 1/42 244/1 A |
| 4,743,740 | A | * | 5/1988 | Adee | B64D 15/00 156/273.9 |
| 4,755,422 | A | * | 7/1988 | Headrick | H05K 5/0213 169/DIG. 2 |
| 4,839,771 | A | * | 6/1989 | Covey | B29C 70/885 244/1 A |
| 4,942,078 | A | * | 7/1990 | Newman | B32B 27/04 219/528 |

(Continued)

*Primary Examiner* — Matthew Daniels
(74) *Attorney, Agent, or Firm* — Miller, Matthias & Hull LLP

(57) ABSTRACT

A method comprises laying up a fiber ply of reinforcing fibers and a metal foil layer in a full face-to-face relation. The fibers in the fiber ply are oriented in a single direction. The metal foil layer includes a plurality of metal foil strips separated by gaps. The metal foil layer has substantially the same length and width as the fiber ply. The method further comprises infusing resin into the layup, wherein the resin flows through the gaps and infuses into the fibers.

12 Claims, 9 Drawing Sheets

(56) References Cited

U.S. PATENT DOCUMENTS

| | | | | |
|---|---|---|---|---|
| 5,127,601 A * | 7/1992 | Schroeder | ............ | B64D 45/02 244/1 A |
| 5,225,265 A * | 7/1993 | Prandy | ................ | B29C 70/026 244/1 A |
| 5,407,195 A * | 4/1995 | Tiitola | .................. | A63B 59/14 473/563 |
| 5,484,642 A * | 1/1996 | Bompard | ............... | B29C 70/22 139/383 R |
| 5,508,493 A * | 4/1996 | Ueyama | ................ | B23K 9/091 219/130.51 |
| 5,643,390 A * | 7/1997 | Don | ...................... | B29C 65/344 156/307.1 |
| 5,723,849 A * | 3/1998 | Matsen | ................ | B21D 26/021 219/615 |
| 5,851,560 A * | 12/1998 | Kobayashi | .......... | B29C 45/1417 264/320 |
| 5,925,275 A * | 7/1999 | Lawson | ................ | B64D 15/12 219/543 |
| 9,156,208 B2 * | 10/2015 | Heim | ................... | B29C 70/443 |

\* cited by examiner

LAMINATED FIBER METAL COMPOSITE

This is a divisional of U.S. Ser. No. 11/328,012 filed 9 Jan. 2006, now U.S. Pat. No. 8,636,963 issued 28 Jan. 2014. U.S. Ser. No. 11/328,012 is a divisional of U.S. Ser. No. 10/649,280 filed 27 Aug. 2003, which was abandoned.

BACKGROUND

FIG. 1 illustrates a conventional laminated fiber metal composite 20 including a body 22 having a plurality of fiber plies 24 and a plurality of metal foil sheets 26 stacked in face to face relation in a predetermined order and orientation. Each fiber ply 24 has a resin mixture (not shown) interspersed between a plurality of reinforcing fibers (not shown). Each metal foil sheet 26 is uninterrupted throughout its length and width and is sized and shaped similarly to the fiber plies 24. Because the metal foil sheets 26 are generally solid, the resin mixture may need to be interspersed between the fibers of each fiber ply and/or positioned between the fiber plies prior to lamination, for example by prepregging the fibers, wet-winding each fiber ply, resin transfer molding, and/or resin film infusion. Fiber metal laminates such as the laminate 20 may be used for many different applications, such as armor systems, high performance automotive components, and high-performance aerospace components.

The solid metal foil sheet between adjacent pre-impregnated fiber plies can increase bearing strength and other properties. However, if it is desired to infuse resin into a dry preform of fiber plies using a resin infusion process, the metal foil sheet can inhibit resin flow, resulting in resin starved regions.

SUMMARY

According to an embodiment herein, a method comprises laying up a fiber ply of reinforcing fibers and a metal foil layer in a full face-to-face relation. The fibers in the fiber ply are oriented in a single direction. The metal foil layer includes a plurality of metal foil strips separated by gaps. The metal foil layer has substantially the same length and width as the fiber ply. The method further comprises infusing resin into the layup, wherein the resin flows through the gaps and infuses into the fibers.

These features and functions may be achieved independently in various embodiments or may be combined in other embodiments. Further details of the embodiments can be seen with reference to the following description and drawings.

DETAILED DESCRIPTION

Figure 2:
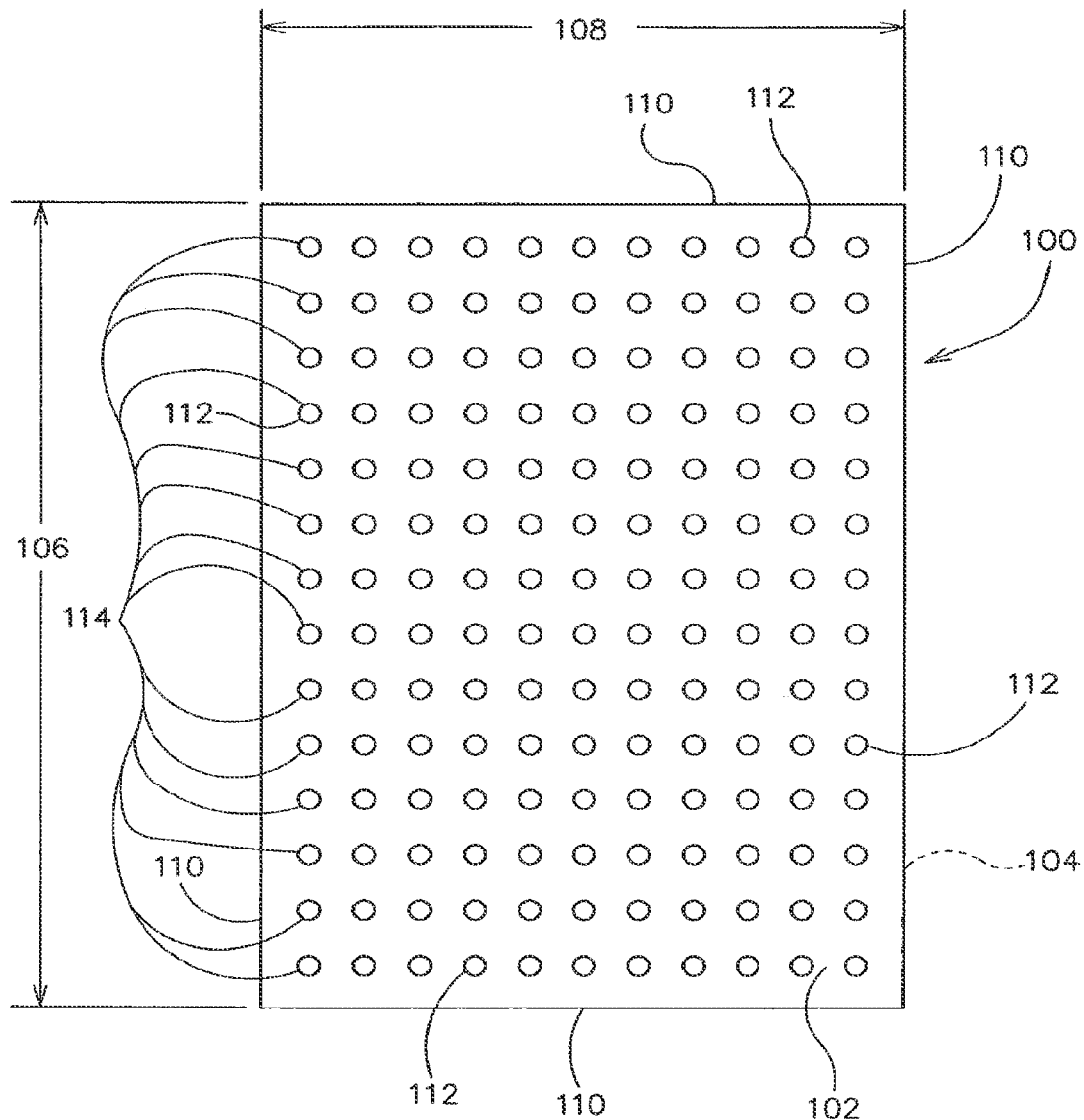
FIGS. 2-4 are illustrations of different metal foil sheets.
Figure 3:
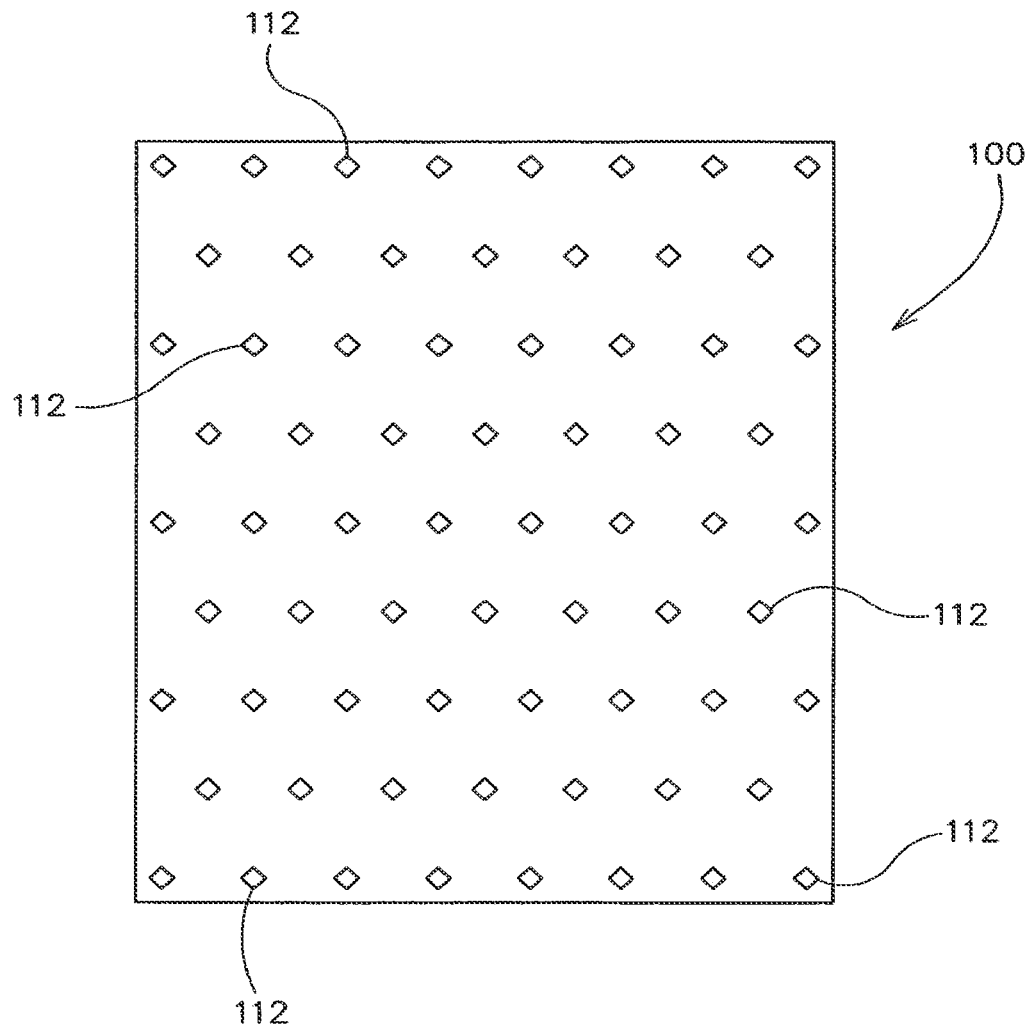
Figure 4:
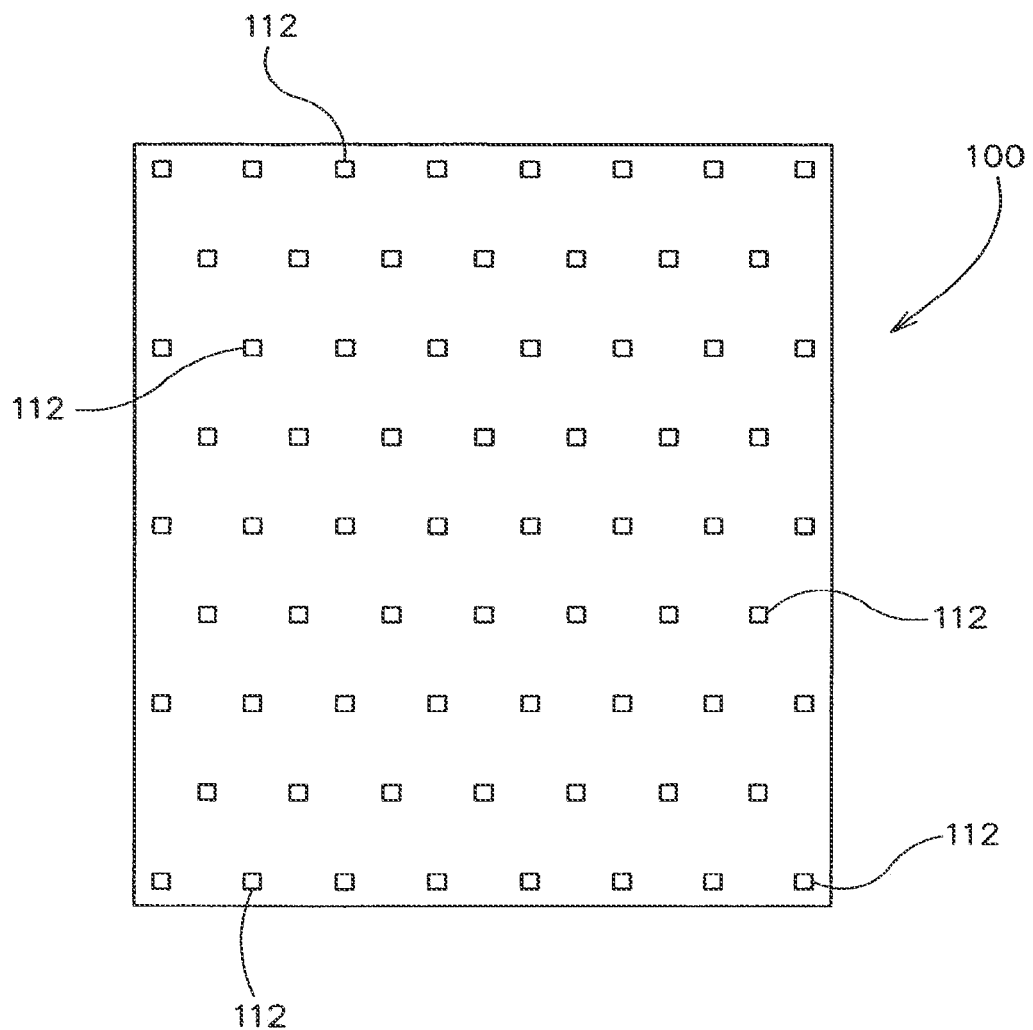

FIG. 2 illustrates a metal foil sheet 100 used in making laminated fiber metal composite structures. The sheet 100 has a first face 102 and a second face 104 opposite the first face. Although the sheet 100 may have other thicknesses, in one embodiment the sheet has a thickness of between about 0.005 inches and about 0.015 inches. The metal foil sheet 100 extends a length 106 and a width 108 between a plurality of edges 110. In one embodiment, the sheet 100 is made of titanium (e.g., Ti 15-3-3-3). In another embodiment, the sheet 100 is made of aluminum (e.g., T-6061). In yet another embodiment, the sheet 100 is a combination of two or more metals. The metal foil sheet 100 is perforated so it has a plurality of openings 112 extending through the sheet from the first face 102 to the second face 104. The openings 112 may have a variety of shapes and sizes suitable to facilitate flow of a resin mixture therethrough. For example, in one embodiment, the openings 112 are generally circular. In alternative embodiments, the openings 112 may have other suitable shapes. For example, the openings may be generally diamond shaped as illustrated in FIG. 3, or generally square as illustrated in FIG. 4. Although the openings 112 may have other dimensions, in one circular opening embodiment, each opening has a diameter of about 0.01 inches. In another embodiment, the openings 112 each have a diameter of about 0.04 inches. In yet another embodiment, the openings 112 each have a diameter of between about 0.01 inches and about 0.04 inches. Furthermore, the metal foil sheet 100 may include a variety of differently shaped and/or sized openings 112. It should be understood that the metal foil sheet 100 may have any number of the openings 112, each having any size and shape suitable for facilitating the flow of a resin mixture through the sheet, regardless of whether such size and shape is explicitly mentioned herein.

The plurality of openings 112 may be arranged on the metal foil sheet 100 in any suitable pattern for facilitating the flow of a resin mixture through the sheet. For example, as illustrated in FIG. 2 the plurality of openings 112 are arranged in a series of rows 114 spaced generally evenly along the sheet length 106, wherein each row has a plurality of the openings spaced generally evenly along a portion of the sheet width 108. FIG. 3 illustrates another exemplary pattern for the openings 112. In one embodiment, the openings 112 are spaced generally evenly apart on the sheet 100 by, for example, between about 0.25 inches and about 2.0 inches. In another embodiment, the openings 112 are spaced apart by varying distances. The plurality of openings 112 may be each spaced from adjacent openings by any suitable distance, and additionally the plurality of openings may be arranged on the sheet 100 in other patterns not specifically discussed and/or illustrated herein.

The plurality of openings 112 may be formed within the sheet using any suitable manufacturing process. For example, in one embodiment the openings 112 are formed by directing a pulsed laser at the metal foil sheet 100.

Figure 1:
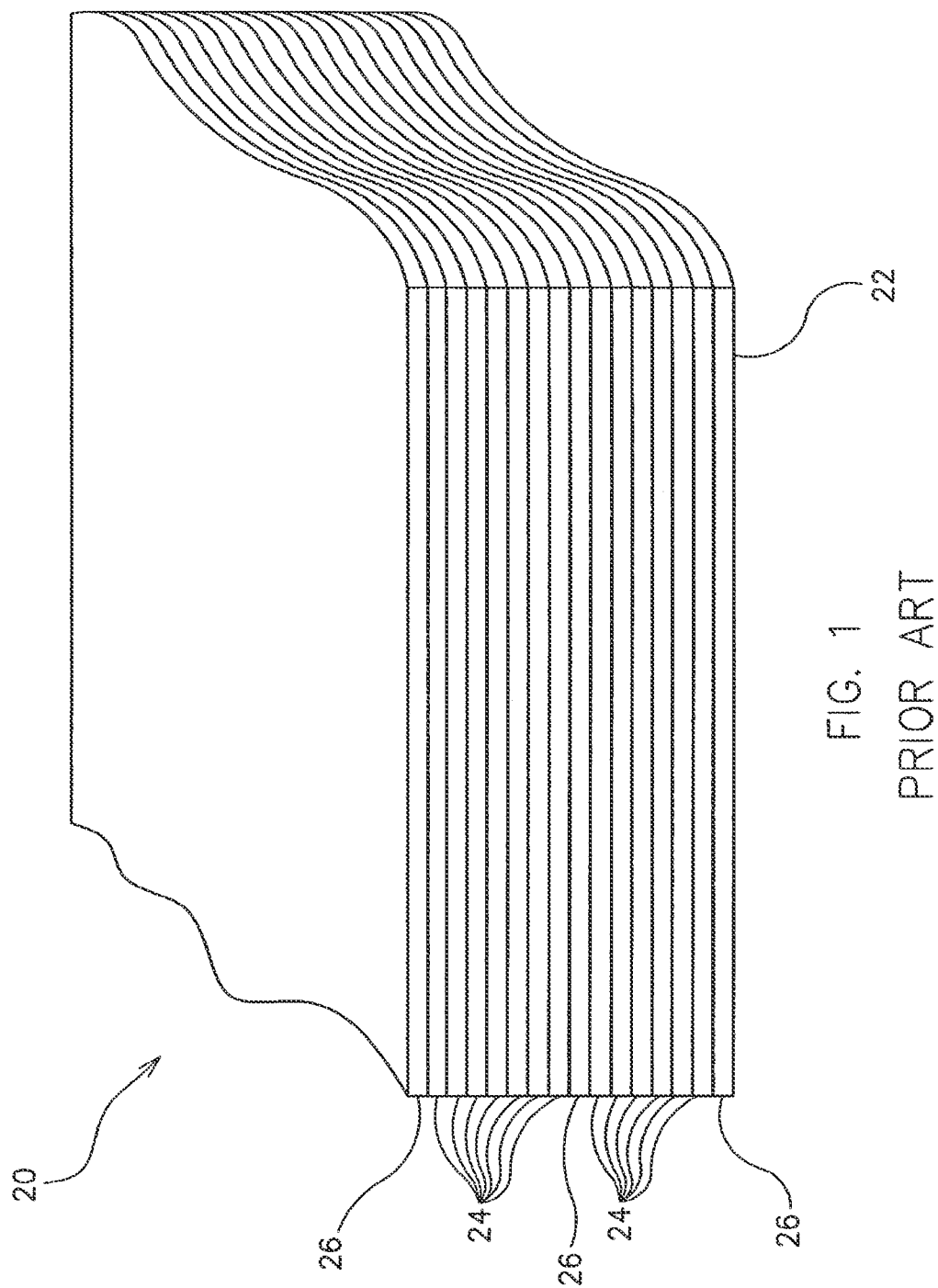
FIG. 1 is an illustration of a portion of a conventional laminated fiber metal composite.
Figure 5:
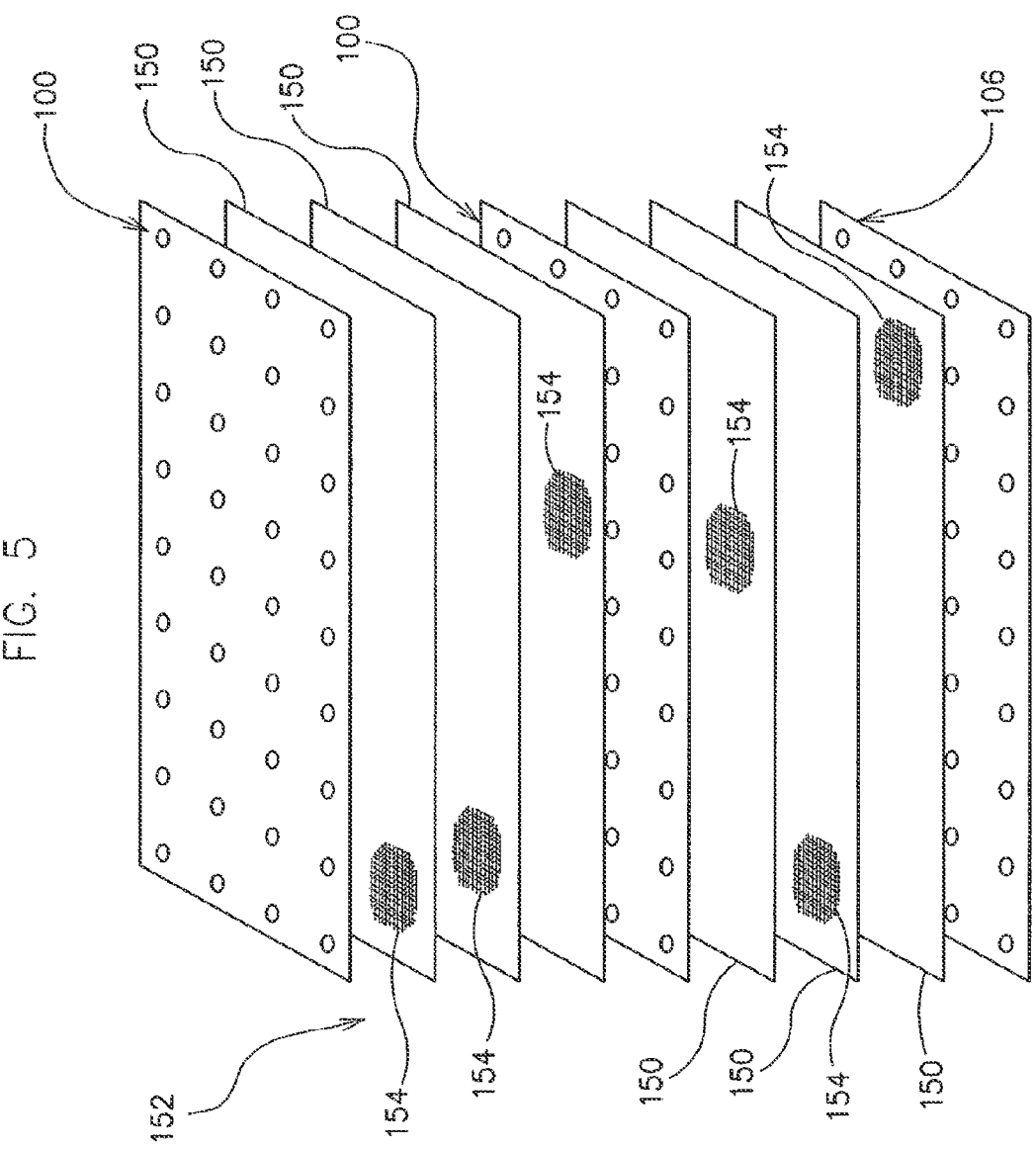
FIG. 5 is an illustration of a laminated fiber metal composite preform.
Figure 6:
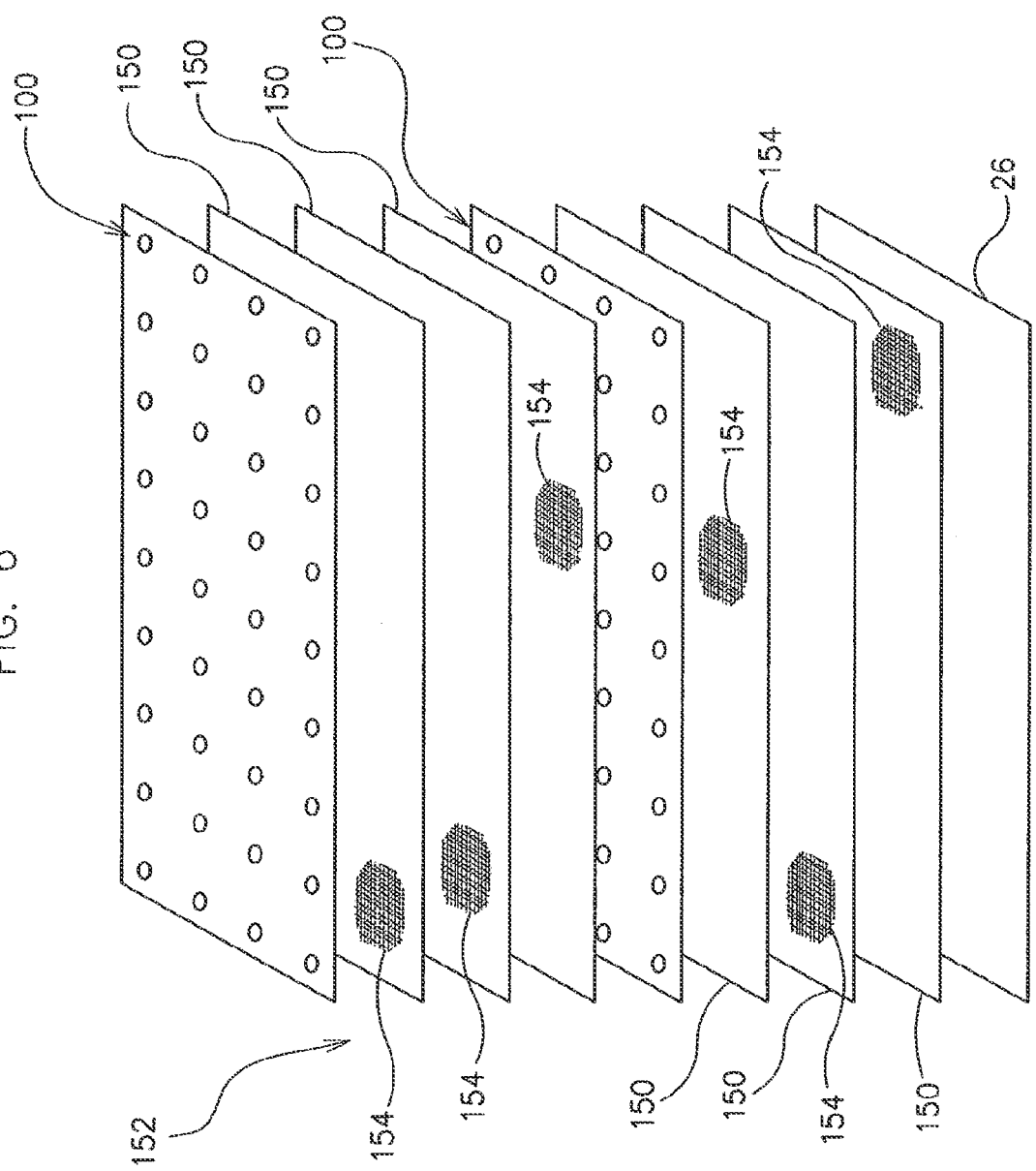
FIG. 6 is an illustration of an alternative laminated fiber metal composite preform.

As illustrated in FIG. 5, at least one metal foil sheet 100 is stacked together with a plurality of fiber plies 150 in face to face relation and in a predetermined order and orientation to form a fiber metal composite preform 152. Similar to the conventional laminated fiber metal composite 20 (FIG. 1), each fiber ply 150 has a plurality of reinforcing fibers 154. In one embodiment, the reinforcing fibers 154 are fiberglass. In another embodiment, the reinforcing fibers 154 are carbon fibers. In yet another embodiment, the reinforcing fibers 154 are aramid fibers. The reinforcing fibers 154 may be any suitable fiber or combination of different fibers. Further, the fibers 154 of each ply may be oriented in one common direction or in a plurality of directions. In the embodiment illustrated in FIG. 5, the preform 152 includes a plurality of metal foil sheets 100, and more specifically includes two perforated metal foil sheets having the plurality of fiber plies 150 positioned between them, and another perforated sheet positioned between two adjacent fiber plies of the plurality of fiber plies. As will be appreciated by those skilled in the art, the fiber plies 150 may be oriented so the fibers of each ply extend in a single common direction or they may be oriented in other directions to provide desired strength and stiffness for the finished body. Additionally, as illustrated in FIG. 6, the plurality of fiber plies 150 may be positioned within the preform 152 between a perforated metal foil sheet 100 and a non-perforated metal foil sheet (e.g., the metal foil sheet 26 illustrated in FIG. 1), and the preform may also include a perforated metal foil sheet positioned between two adjacent fiber plies of the plurality of fiber plies. However, the preform 152 may include any number of metal foil sheets whether perforated or non-perforated, such that the preform 152 includes a perforated metal foil sheet 100 having a face (e.g., the first face 102) positioned adjacent a fiber ply 150. Furthermore, the fiber metal composite preform 152 may include a variety of metal foil sheets, whether perforated or non-perforated, formed from different metals and/or metal alloys.

Figure 7:
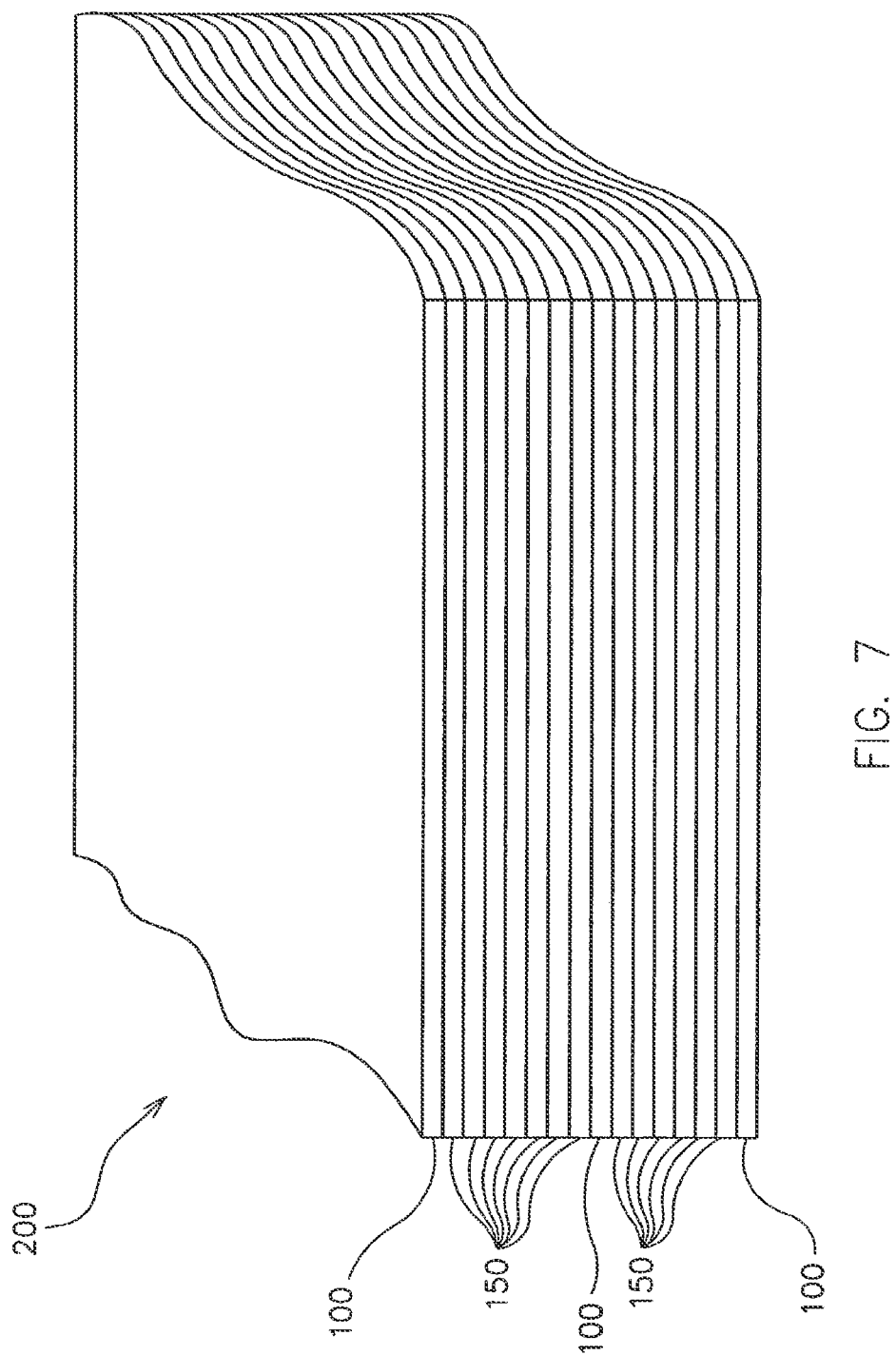
FIG. 7 is an illustration of a laminated fiber metal composite body.

To form a laminated fiber metal composite body, such as the laminated fiber metal composite body portion illustrated in FIG. 7 and generally designated by the reference numeral 200, the fiber metal composite preform 152 (FIG. 5) is infused with a resin mixture and laminated to bond the plurality of fiber plies 150 and the metal foil sheet(s) 100 together. In one embodiment, the body 200 is cured after lamination to facilitate bonding the plurality of fiber plies 150 and the metal foil sheets(s) 100 together. More specifically, a resin infusion process is used to infuse the resin mixture into the preform 152 such that the resin mixture flows through the plurality of fiber plies 150 and the openings 112 (FIG. 5) within the metal foil sheet(s) 100. As the resin mixture flows through the fiber plies 150 and the metal foil sheet(s) 100, the resin mixture intersperses between the plurality of fiber plies, and more specifically between the reinforcing fibers 154 of each fiber ply. A variety of resin infusion processes are suitable for infusing a resin mixture into the preform 152, such as, for example, resin transfer molding, vacuum assisted resin transfer molding, seemann composites resin infusion molding process (SCRIMP®), and controlled atmospheric pressure resin infusion. SCRIMP is a federally registered trademark of TPI Technology, Inc of Warren, R.I. A mold may be used during stacking of the fiber plies 150 and the metal foil sheet(s) 100, and during lamination of the preform 152, to control a shape of the laminated fiber metal composite body 200.

Figure 8:
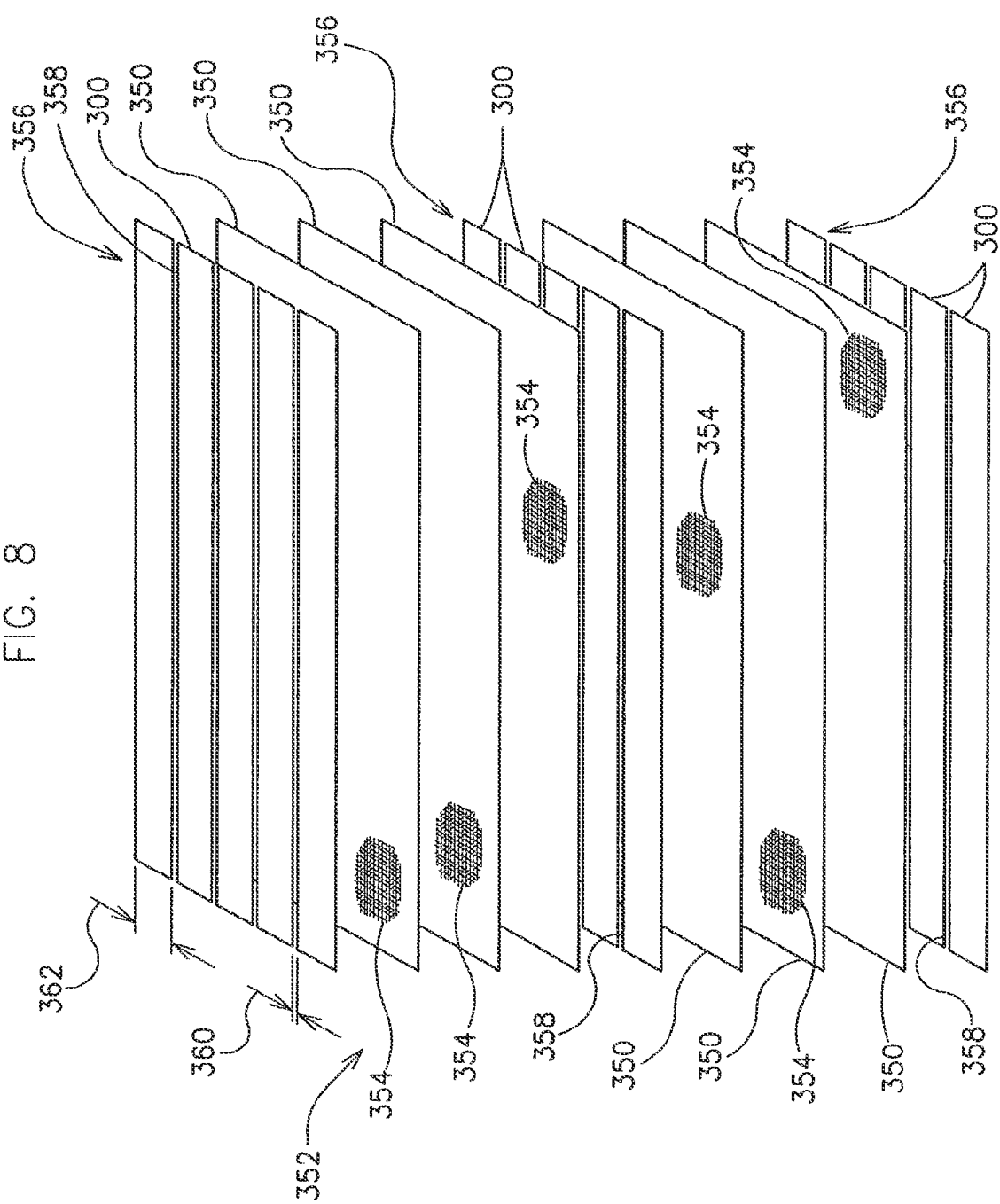
FIG. 8 is an illustration of an alternative laminated fiber metal composite preform.

Reference is now made to FIG. 8, which illustrates a fiber-metal composite perform 352 including a plurality of fiber plies 350 and metal foil layers 356. The metal foil layers 356 are stacked with the fiber plies 350 in a face-to-face relationship and in a predetermined order and orientation.

Similar to the laminated fiber metal composite 200 of FIG. 7, each fiber ply 350 has a plurality of reinforcing fibers 354 such as fiberglass, carbon fibers or aramid fibers. The reinforcing fibers 354 may be any suitable fiber or combination of different fibers. Further, the fibers 354 of each ply may be oriented in one common direction or in a plurality of directions.

Each metal foil layer 356 includes a plurality of metal foil strips 300. Although the metal foil strips 300 may have other thicknesses, in one embodiment the strips 300 each have a thickness of between about 0.005 inches and about 0.015 inches. The thickness of each strip 300 may vary along its length and/or width. Further, some metal foil strips 300 may have different thicknesses from other strips 300. In one embodiment, the strips 300 are made of titanium (e.g., TI 15-3-3-3). In another embodiment, the strips 300 are made of aluminum (e.g., T-6061). In another embodiment, the strips 300 are made of a combination of two or more metals. Although the metal foil strips 300 of FIG. 8 are shown as being generally rectangular, the strips 300 of other embodiments may have a variety of shapes and sizes.

In the embodiment illustrated in FIG. 8, the metal foil strips 300 in each layer 356 are arranged in side by side relationship. The metal foil strips 300 are arranged side by side so that at least two adjacent strips 300 in each metal foil layer 356 are spaced by a gap 358. In one embodiment, each of the metal foil strips 300 is spaced from adjacent strips by a gap 358. The gaps 358 facilitate flow of resin mixture through the metal foil layer 356, and more specifically through the gaps 358.

Although the gaps 358 may have other widths 360, in one embodiment each of the gaps 358 has a width 360 of between about 0.01 inches and about 0.05 inches. The gaps 358 may have varying widths 360 to facilitate flow of a resin mixture through the gaps 358. Additionally, each metal foil layer 356 may include any number of metal foil strips 300, and the strips 300 within each layer 356 may be spaced by gaps 358 having any suitable width 360. The widths 360 may be identical within each layer 356, vary within each layer 356, vary from layer 356 to layer 356, or be constant throughout the preform 352.

Although the metal foil strips 300 may have other widths 362, in one embodiment, the width 362 is between about 0.125 inches and about 2.0 inches. In one embodiment the strips 300 have varying widths 362. For example, some or all of the metal foil strips 300 may have widths 362 that vary along their respective lengths.

In the embodiment illustrated in FIG. 8, the preform 352 includes a first metal foil layer 356, a first stack of three fiber plies 350 on the first metal foil layer 356, a second metal foil layer 356 on the first stack of fiber plies 350, a second stack of fiber plies 350 on the second metal foil layer 356, and a third metal foil layer 356 on the second stack of fiber plies 350. The fiber plies 350 may be oriented so the fibers of each ply 560 extend in a single common direction or they may be oriented in other directions to provide desired strength and stiffness for the finished body.

The plurality of strips 300 may be arranged within each layer 356 in any suitable pattern. Further, the pattern in which the strips 300 are arranged may vary from layer to layer or be similar for each layer. For example, as illustrated in FIG. 8 the plurality of strips 300 in each layer 356 may extend longitudinally along a length of the preform 352. Alternatively, the plurality of strips 300 in one or more layers 356 may extend transversely across a width of the preform 352. As an example of another configuration, a plurality of strips 300 may extend diagonally across the preform 352, a plurality of strips 300 may be woven together, and/or a plurality of strips 300 may overlap one another in a criss-cross pattern. Additionally, a plurality of glass fibers (not shown) may be woven around one or more of the strips 300 to control the gaps 358 between the strips and control the position of the strips within the preform 352, regardless of the pattern in which the strips 300 are arranged. The plurality of strips 300 in each layer 356 may be arranged in other patterns not specifically discussed and/or illustrated herein, such that the strips 300 in each layer 356 are arranged in any suitable pattern facilitating the flow of a resin mixture through the metal foil layer 356.

In some embodiments of a preform, the plurality of fiber plies 350 may be positioned between a metal foil layer 356 and a metal foil sheet (e.g., the metal foil sheet 26 illustrated in FIG. 1 or the perforated metal foil sheet 100 illustrated in FIG. 2), and a layer of metal foil strips may be positioned between two adjacent fiber plies of the plurality of fiber plies. Such a preform may include any number of metal foil layers 356, and additionally may include any number of metal foil sheets (whether perforated or non-perforated) such that the preform includes a layer of metal foil strips 300 positioned adjacent a fiber ply 350. Furthermore, the preform may include a variety of metal foil strips 300, and that these strips 300 may be arranged in the same layer 356 or different layers. Still further, the strips 300 may be formed from different metals and/or metal alloys.

Figure 9:
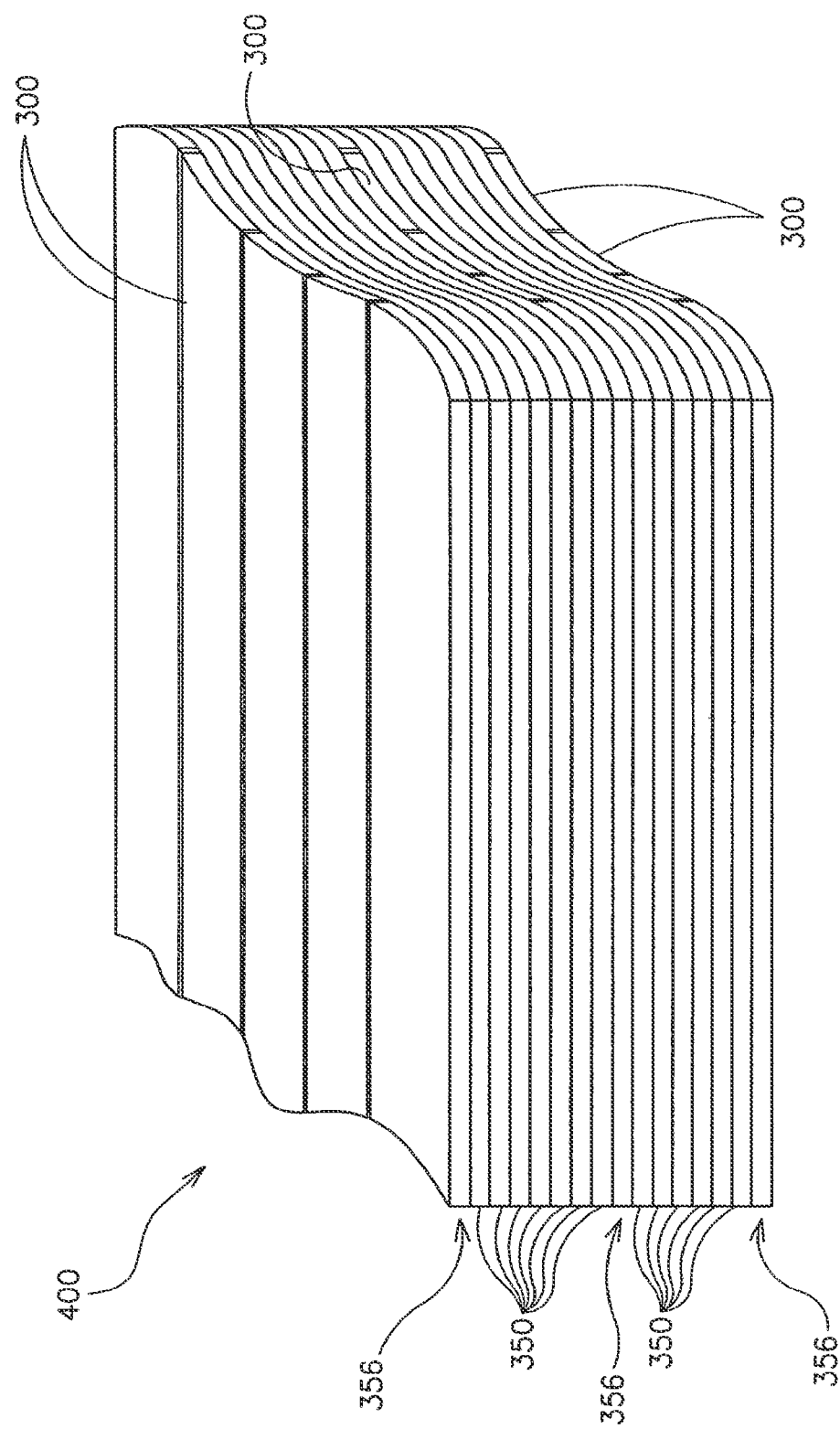
FIG. 9 is an illustration of an alternative laminated fiber metal composite body.

To form a laminated fiber metal composite body, generally designated by 400 in FIG. 9, the fiber metal composite preform 352 (FIG. 8) is infused with a resin mixture and laminated to bond the plurality of fiber plies 350 to the metal foil layer(s) 356. In one embodiment, the body 400 is cured after lamination to facilitate bonding the plurality of fiber plies 350 to the metal foil layer(s) 356. More specifically, a resin infusion process is used to infuse the resin mixture into the preform 352 such that the resin mixture flows through the plurality of fiber plies 350 and the gaps 358 (FIG. 8) in the metal foil layer(s) 356. As the resin mixture flows through the fiber plies 350 and the metal foil layer(s) 356, the resin mixture intersperses between the plurality of fiber plies 350, and more specifically between the reinforcing fibers 354 of each fiber ply 350. A variety of resin infusion processes are suitable for infusing a resin mixture into the preform 352, such as, for example, resin transfer molding, vacuum assisted resin transfer molding, SCRIMP®, and controlled atmospheric pressure resin infusion. A mold may be used when stacking the fiber plies 350 and the metal foil layer(s) 356, and during lamination of the preform 352, to control a shape of the laminated fiber metal composite body 400.

The above-described perforated metal foil sheet and layer of metal foil strips are cost-effective and reliable for facilitating infusion of a resin mixture into a fiber metal composite without generally sacrificing the bearing strength of the composite. More specifically, during a resin infusion process, resin flows through the perforations in the metal foil sheet and/or the gaps in the metal foil layer, and intersperses between a plurality of fiber plies stacked together with the metal foil sheet and/or the metal foil layer. As a result, a conventional resin infusion process may be used during lamination without the need to prepreg the fibers, wet-wind the fiber plies, and/or insert thin sheets of resin between the fiber plies prior to lamination.

The invention claimed is:

1. A method comprising:
   laying up a fiber ply of reinforcing fibers and a metal foil layer in a full face-to-face relation, the fibers in the fiber ply oriented in a single direction, the metal foil layer including a plurality of imperforate metal foil strips separated by gaps, the metal foil layer having substantially the same length and width as the fiber ply; and
   infusing resin into the layup, wherein the resin flows through the gaps and infuses into the fibers.

2. The method of claim 1, further comprising curing the resin-infused layup to form a fiber-metal laminate including both the reinforcing fibers and the metal foil layer.

3. The method of claim 1, wherein the metal foil strips are generally parallel.

4. The method of claim 1, wherein each of the metal foil strips has a width between about 0.125 inches and about 2.0 inches.

5. The method of claim 1, wherein the metal foil strips have different sizes and shapes.

6. The method of claim 1, further comprising laying up a second fiber ply, wherein the metal foil layer is between the fiber plies.

7. The method of claim 1, further comprising laying up a second metal foil layer, wherein the fiber ply is positioned between the metal foil layers.

8. The method of claim 7, wherein the second metal foil layer includes metal foil strips separated by gaps.

9. The method of claim 7, wherein the second foil layer is non-perforated.

10. The method of claim 1, further comprising weaving a plurality of glass fibers around at least one of the strips to control the gaps between the strips and to control the position of the strips.

11. The method of claim 1, wherein the metal foil layer reduces resin starved regions in the layup during resin infusion.

12. A method comprising:
    laying up a fiber ply of reinforcing fibers and a metal foil layer n a full face-to-face relation, the fibers in the fiber ply oriented in a single direction, the metal foil layer including a plurality of metal foil strips separated by gaps having a width between about 0.01 inches and about 0.05 inches, the metal foil layer having substantially the same length and width as the fiber ply; and
    infusing resin into the layup, wherein the resin flows through the gaps and infuses into the fibers.

\* \* \* \* \*